(12) United States Patent
Dockser et al.

(10) Patent No.: US 9,164,772 B2
(45) Date of Patent: Oct. 20, 2015

(54) HYBRID QUEUE FOR STORING INSTRUCTIONS FROM FETCH QUEUE DIRECTLY IN OUT-OF-ORDER QUEUE OR TEMPORARILY IN IN-ORDER QUEUE UNTIL SPACE IS AVAILABLE

(75) Inventors: Kenneth Alan Dockser, Cary, NC (US); Yusuf Cagatay Tekmen, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 13/357,652

(22) Filed: Jan. 25, 2012

(65) Prior Publication Data
US 2012/0204004 A1 Aug. 9, 2012

Related U.S. Application Data

(60) Provisional application No. 61/439,602, filed on Feb. 4, 2011.

(51) Int. Cl.
G06F 9/30 (2006.01)
G06F 9/38 (2006.01)

(52) U.S. Cl.
CPC ............ *G06F 9/3836* (2013.01); *G06F 9/3814* (2013.01); *G06F 9/3855* (2013.01); *G06F 9/3877* (2013.01)

(58) Field of Classification Search
None
See application file for complete search history.

(56) References Cited

U.S. PATENT DOCUMENTS

| 5,870,616 | A | 2/1999 | Loper et al. |
| 6,112,019 | A | 8/2000 | Chamdani et al. |
| 6,192,465 | B1 | 2/2001 | Roberts |
| 6,216,200 | B1 | 4/2001 | Yeager |
| 6,697,939 | B1 | 2/2004 | Kahle |
| 6,816,960 | B2 | 11/2004 | Koyanagi |
| 7,647,475 | B2 | 1/2010 | Svendsen et al. |
| 7,823,158 | B2 | 10/2010 | Beatty, III et al. |

(Continued)

FOREIGN PATENT DOCUMENTS

WO 9637829 A1 11/1996

OTHER PUBLICATIONS

Bai, et al., "A Low-Power In-Order/Out-of-Order Issue Queue", ACM Transactions on Architecture and Code Optimization, vol. 1, No. 2, Jun. 2004, pp. 152-179.*

(Continued)

*Primary Examiner* — Kenneth Kim
(74) *Attorney, Agent, or Firm* — Peter Michael Kamarchik; Nicholas J. Pauley; Paul Holdaway

(57) ABSTRACT

A queuing apparatus having a hierarchy of queues, in one of a number of aspects, is configured to control backpressure between processors in a multiprocessor system. A fetch queue is coupled to an instruction cache and configured to store first instructions for a first processor and second instructions for a second processor in an order fetched from the instruction cache. An in-order queue is coupled to the fetch queue and configured to store the second instructions accepted from the fetch queue in response to a write indication. An out-of-order queue is coupled to the fetch queue and to the in-order queue and configured to store the second instructions accepted from the fetch queue in response to an indication that space is available in the out-of-order queue, wherein the second instructions may be accessed out-of-order with respect to other second instructions executing on different execution pipelines.

23 Claims, 5 Drawing Sheets

(56) References Cited

U.S. PATENT DOCUMENTS

| | | |
|---|---|---|
| 7,890,708 B2 | 2/2011 | Barrett et al. |
| 2003/0163671 A1 | 8/2003 | Gschwind et al. |
| 2004/0030866 A1 | 2/2004 | McDonald |
| 2004/0168045 A1 | 8/2004 | Morris et al. |
| 2007/0028078 A1 | 2/2007 | Harris et al. |
| 2007/0074005 A1 | 3/2007 | Abernathy et al. |
| 2010/0146247 A1 | 6/2010 | Ban et al. |
| 2010/0332787 A1 | 12/2010 | Grohoski et al. |
| 2012/0204008 A1 | 8/2012 | Dockser et al. |

OTHER PUBLICATIONS

Abella et al., "Power- and complexity-aware issue queue designs" IEEE MICRO, Sep. 1, 2003, pp. 50-58, vol. 23, No. 5, IEEE Service Center, XP011103009, ISSN: 0272-1732, DOI: 10.1109/MM.2003.1240212.

International Search Report and Written Opinion—PCT/US2012/023996—ISA/EPO—Mar. 28, 2012.

* cited by examiner

HYBRID QUEUE FOR STORING INSTRUCTIONS FROM FETCH QUEUE DIRECTLY IN OUT-OF-ORDER QUEUE OR TEMPORARILY IN IN-ORDER QUEUE UNTIL SPACE IS AVAILABLE

The present application for patent claims priority to Provisional Application No. 61/439,602 entitled "Processor with a Hybrid Instruction Queue" filed Feb. 4, 2011, and assigned to the assignee hereof and hereby expressly incorporated by reference herein.

FIELD OF THE INVENTION

The present invention relates generally to techniques for organizing and managing an instruction queue in a processing system and, more specifically, to techniques for bifurcating an instruction queue into sections with in-order and out-of-order read access.

BACKGROUND OF THE INVENTION

Many products, such as cell phones, laptop computers, personal digital assistants (PDA), desktop computers, or the like, incorporate one or more processors executing programs that support communication and multimedia applications. The processors need to operate with high performance and efficiency to support the plurality of computationally intensive functions for such products.

The processors operate by fetching instructions from a unified instruction fetch queue which is generally coupled to an instruction cache. There is often a need to have a sufficiently large in-order unified instruction fetch queue supporting the processors to allow for the evaluation of the instructions for efficient dispatching. For example, in a system having two or more processors that share a unified instruction fetch queue, one of the processors may be a coprocessor. In such a system, it is often necessary to have a coprocessor instruction queue downstream from the unified instruction fetch queue. This downstream queue should be sufficiently large to minimize backpressure on processor instructions in the instruction fetch queue to reduce the effect of coprocessor instructions on the performance of the processor. However, large instruction queues may be cost prohibitive in terms of power use, implementation area, and impact to timing and performance to provide the support needed for coprocessor instructions.

SUMMARY

Among its several aspects, the present invention recognizes a need for improved instruction queues in a multiple processor system. To such ends, an embodiment of the invention applies a queuing apparatus having a hierarchy of queues. A fetch queue is coupled to an instruction cache and configured to store first instructions for a first processor and second instructions for a second processor in an order fetched from the instruction cache. An in-order queue is coupled to the fetch queue and configured to store the second instructions accepted from the fetch queue in response to a write indication, wherein the second instructions are maintained in the order fetched. An out-of-order queue is coupled to the fetch queue and to the in-order queue and configured to store the second instructions accepted from the fetch queue in response to an indication that space is available in the out-of-order queue, wherein the second instructions may be accessed out-of-order with respect to other second instructions executing on different execution pipelines.

Another embodiment of the invention addresses a method for queuing instructions. Instructions are accepted in an out-of-order queue when space is available in the out-of-order queue. The instructions are accepted in an in-order queue when space is not available in the out-of-order queue, wherein the in-order queue is configured to provide instructions accepted in the in-order queue to the out-of-order queue when space is available in the out-of-order queue.

Another embodiment of the invention addresses a method for issuing instructions. A first set of instructions and a second set of instructions are received in a program order. The first set of received instructions is stored in an out-of-order queue until the out-of-order queue is full. The second set of received instructions is stored in an in-order queue in response to an indication that the out-of-order queue is full. The second set of received instructions stored in the in-order queue is moved to the out-of-order queue when space is available in the out-of-order queue. The first set of received instructions stored in the out-of-order queue is issued to separate execution pipelines, wherein the first set of received instructions accessed may be out-of-order with respect to other issued instructions executing on different execution pipelines.

Another embodiment of the invention addresses a queuing apparatus having a hierarchy of queues. Means for storing first instructions for a first processor and second instructions for a second processor in a fetch queue in an order fetched from an instruction cache. Means for storing in an in-order queue the second instructions accepted from the fetch queue in response to a write indication, wherein the second instructions are maintained in the order fetched. Means for storing in an out-of-order queue the second instructions accepted from the fetch queue in response to an indication that space is available in the out-of-order queue, wherein the second instructions may be accessed out-of-order with respect to other second instructions executing on different execution pipelines.

Another embodiment of the invention addresses a computer readable non-transitory medium encoded with computer readable program data and code for operating a system. Instructions are accepted in an out-of-order queue when space is available in the out-of-order queue. The instructions are accepted in an in-order queue when space is not available in the out-of-order queue, wherein the in-order queue is configured to provide instructions accepted in the in-order queue to the out-of-order queue when space is available in the out-of-order queue.

Another embodiment of the invention addresses a computer readable non-transitory medium encoded with computer readable program data and code for operating a system. A first set of instructions and a second set of instructions are received in a program order. The first set of received instructions is stored in an out-of-order queue until the out-of-order queue is full. The second set of received instructions is stored in an in-order queue in response to an indication that the out-of-order queue is full. The second set of received instructions stored in the in-order queue is moved to the out-of-order queue when space is available in the out-of-order queue. The first set of received instructions stored in the out-of-order queue is issued to separate execution pipelines, wherein the first set of received instructions accessed may be out-of-order with respect to other issued instructions executing on different execution pipelines.

It is understood that other embodiments of the present invention will become readily apparent to those skilled in the art from the following detailed description, wherein various embodiments of the invention are shown and described by way of illustration. It will be realized that the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of the present invention are illustrated by way of example, and not by way of limitation, in the accompanying drawings, wherein.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thoroughly illustrate the scope of the invention to those skilled in the art.

Computer program code or "program code" for being operated upon or for carrying out operations according to the teachings of the invention may be initially written in a high level programming language such as C, C++, JAVA®, Smalltalk, JavaScript®, Visual Basic®, TSQL, Perl, or in various other programming languages. A program written in one of these languages is compiled to a target processor architecture by converting the high level program code into a native assembler program. Programs for the target processor architecture may also be written directly in the native assembler language. A native assembler program uses instruction mnemonic representations of machine level binary instructions specified in a native instruction format, such as a 32-bit native instruction format. Program code or computer readable medium as used herein refers to machine language code such as object code whose format is understandable by a processor.

Figure 1:
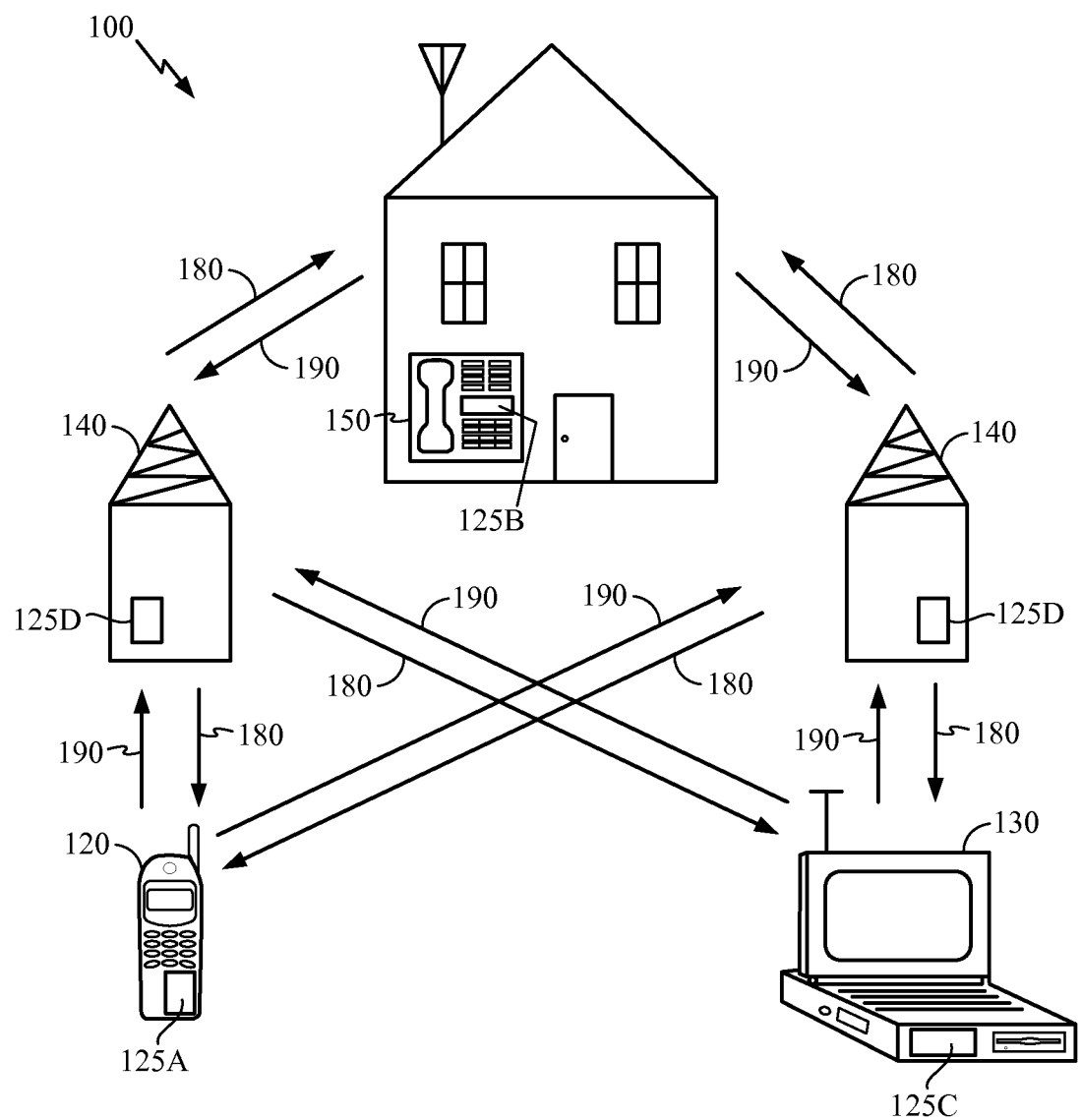
FIG. 1 is a block diagram of an exemplary wireless communication system in which an embodiment of the invention may be advantageously employed.

FIG. 1 illustrates an exemplary wireless communication system 100 in which an embodiment of the invention may be advantageously employed. For purposes of illustration, FIG. 1 shows three remote units 120, 130, and 150 and two base stations 140. It will be recognized that common wireless communication systems may have many more remote units and base stations. Remote units 120, 130, 150, and base stations 140 which include hardware components, software components, or both as represented by components 125A, 125C, 125B, and 125D, respectively, have been adapted to incorporate embodiments of the invention as discussed further below. FIG. 1 shows forward link signals 180 from the base stations 140 to the remote units 120, 130, and 150 and reverse link signals 190 from the remote units 120, 130, and 150 to the base stations 140.

In FIG. 1, remote unit 120 is shown as a mobile telephone, remote unit 130 is shown as a portable computer, and remote unit 150 is shown as a fixed location remote unit in a wireless local loop system. By way of example, the remote units may alternatively be cell phones, smart phones, pagers, walkie talkies, handheld personal communication system (PCS) units, tablets, portable data units such as personal digital assistants, or fixed location data units such as meter reading equipment. Although FIG. 1 illustrates remote units according to the teachings of the disclosure, the disclosure is not limited to these exemplary illustrated units. Embodiments of the invention may be suitably employed in any processor system having a two or more processors sharing an instruction queue.

Instruction queues may be implemented as in-order queues or out-of-order (OoO) queues. In-order instruction queues are basically first-in first-out (FIFO) queues that are configured to enforce a strict ordering of instructions. The first instructions that are stored in a FIFO queue are the first instructions that are read out, thereby tracking instructions in program order. Since many instructions that do not have dependencies can execute out-of-order, the strict FIFO order prevents executable out-of-order instructions from being executed. An out-of-order instruction queue, as used herein, is configured to write instructions in-order and to access instructions out-of-order. Such OoO instruction queues are more complex as they require an additional means of tracking program order and dependencies between instructions, since instructions in the queue may be accessed in a different order than they were entered. Also, the larger an OoO instruction queue becomes, the more expensive the tracking means becomes.

A processor complex instruction queue of the present invention consists of a combination of a processor instruction fetch queue and a coprocessor instruction queue. The processor instruction fetch queue is configured as a FIFO in-order instruction queue and stores a plurality of processor instructions and coprocessor instructions according to a program ordering of instructions. The coprocessor instruction queue is configured as a hybrid queue comprising an in-order FIFO queue and an out-of-order queue. The coprocessor instruction queue is coupled to the processor instruction fetch queue, from which coprocessor instructions are accessed out-of-order with respect to processor instructions and accessed in-order with respect to coprocessor instructions.

Figure 2:
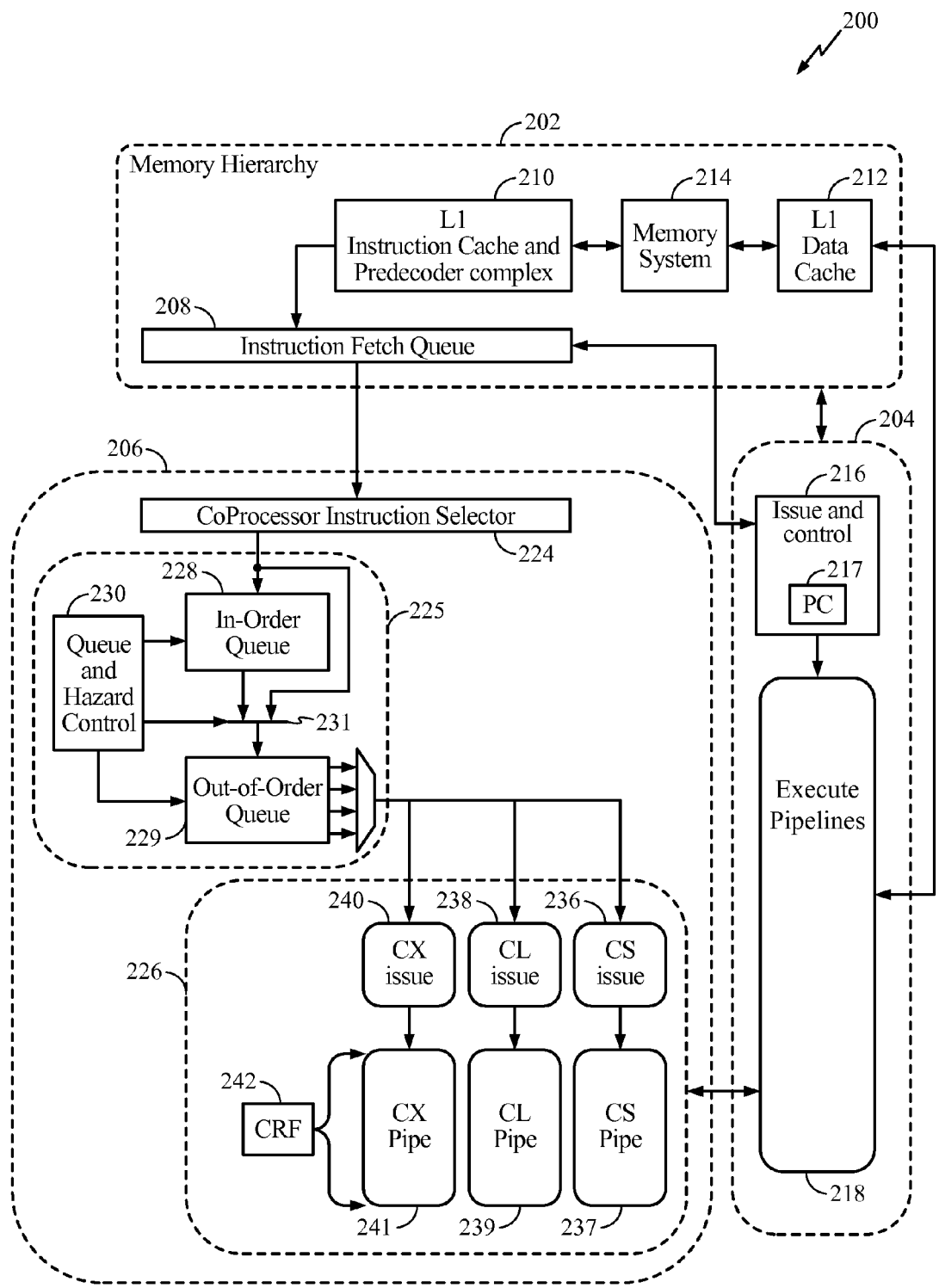
FIG. 2 is a graphical illustration of a processor complex with a memory hierarchy, processor, and a coprocessor in which an embodiment of the invention may be advantageously employed.

FIG. 2 illustrates a processor complex 200 with a memory hierarchy 202, processor 204, and a coprocessor 206. The memory hierarchy 202 includes an instruction fetch queue 208, a level 1 instruction cache (L1 I-cache) and predecoder complex circuit 210, a level 1 data cache (L1 D-cache) 212, and a memory system 214. While the instruction fetch queue 208 is shown in the memory hierarchy 202 it may also be suitably located in the processor 204 or in the coprocessor 206. Peripheral devices which may connect to the processor complex are not shown for clarity of discussion. The processor complex 200 may be suitably employed in hardware components 125A-125D of FIG. 1 for executing program code that is stored in the L1 I-cache and predecoder complex 210, utilizing data stored in the L1 D-cache 212 and associated with the memory system 214, which may include higher levels of cache and main memory. An instruction fetched from the memory system 214 is decoded to determine whether the fetch instruction is a coprocessor instruction. A fetched instruction identified as a coprocessor instruction is encoded with a short identifier, such as having all "1's" in three most significant bit positions in the encoded coprocessor instruction, for example. The encoded coprocessor instruction is then loaded in the L1 I-cache and predecoder complex 210 and also forwarded to the instruction fetch queue 208. The short identifier allows fast decoding for identification of coprocessor instructions in the instruction fetch queue 208.

The processor 204 may be a general purpose processor, a multi-threaded processor, a digital signal processor (DSP), an application specific processor (ASP) or the like. The coprocessor 206 may be a general purpose processor, a digital signal processor, a vector processor, a single instruction multiple data (SIMD) processor, an application specific coprocessor or the like. The various components of the processing complex 200 may be implemented using application specific integrated circuit (ASIC) technology, field programmable gate array (FPGA) technology, or other programmable logic, discrete gate or transistor logic, or any other available technology suitable for an intended application.

The processor 204 includes, for example, an issue and control circuit 216 having a program counter (PC) 217 and execution pipelines 218. The issue and control circuit 216 fetches a packet of, for example, four instructions from the L1 I-cache and predecoder complex 210 according to the program order of instructions from the instruction fetch queue 208 for processing by the execution pipelines 218. If an instruction fetch operation misses in the L1 I-cache and predecoder complex 210, the instruction is fetched from the memory system 214 which may include multiple levels of cache, such as a level 2 (L2) cache, and main memory. It is appreciated that the four instructions in the packet are decoded and issued to the execution pipelines 218 in parallel. Since architecturally a packet is not limited to four instructions, more or less than four instructions may be issued and executed in parallel depending on an implementation and an application's requirements.

The processor complex 200 may be configured to execute instructions under control of a program stored on a non-transitory computer readable storage medium. For example, a computer readable storage medium may be either directly associated locally with the processor complex 200, such as may be available from the L1 I-cache and predecoder complex 210, for operation on data obtained from the L1 D-cache 212, and the memory system 214. A program comprising a sequence of instructions may be loaded to the memory hierarchy 202 from other sources, such as a boot read only memory (ROM), a hard drive, an optical disk, or from an external interface, such as a network.

The coprocessor 206 includes, for example, a coprocessor instruction selector 224, a hybrid instruction queue 225, and a coprocessor execution complex 226. The hybrid instruction queue 225 comprising an in-order FIFO queue 228, an out-of-order queue 229, with a queue and hazard control circuit 230 configured to manage both queues. Coprocessor instructions are selected from the instruction fetch queue 208 out-of-order with respect to processor instructions and in-order with respect to coprocessor instructions. The hybrid instruction queue 225 is coupled to the instruction fetch queue 208 by means of the coprocessor instruction selector 224. The coprocessor instruction selector 224 has access to a plurality of instructions in the instruction fetch queue 208 and is able to identify coprocessor instructions within the plurality of instructions it has access to for selection. The coprocessor instruction selector 224 gathers instructions from the instruction fetch queue 208 and provides the gathered instructions to the hybrid instruction queue 225.

In the hybrid instruction queue 225, when instructions arrive as accessed from the instruction fetch queue 208, the received instructions are stored in the out-of-order queue 229 if there is room therein. Otherwise the instructions are placed in the FIFO queue 228 and are moved to the out-of-order queue 229 when there is space available in the OoO queue 229. A multiplexer 231 is used to select a bypass path for instructions received from the coprocessor instruction selector 224 or to select instructions received from the FIFO queue 228, under control of the queue and hazard control circuit 230. The queue and hazard control circuit 230, among its many features, supports processes 300, 320, and 340 shown in FIGS. 3A, 3B, and 3C respectively, and described in further detail below. Coprocessor instructions are written to the OoO queue 229 in the order the coprocessor instructions are received. For a coprocessor having multiple execution pipelines, such as shown in the coprocessor execution complex 226, the coprocessor instructions are read from the OoO queue 229 in-order with respect to a same target execution pipeline, but may be out-of-order across different target execution pipelines. For example, CX instructions may be executed in-order with respect to other CX instructions, but may be executed out-of-order with respect to CL and CS instructions. In another embodiment, the execution pipelines may individually be configured to be out-of-order. For example, a CX instruction may be executed out-of-order with other CX instructions. However, additional dependency tracking may be required at the execution pipeline level to provide such out-of-order execution capability. The queue and hazard control circuit 230 checks for dependencies between instructions and controls instruction issue to avoid hazards, such as dependency conflicts between instructions. Dispatching, as used herein, is defined as moving an instruction from the instruction fetch queue 208 to processor 204 or to coprocessor 206. Issuing, as used herein, is defined as sending an instruction, in a standard format, a decoded format, or an elaborated format for example, to an associated execution pipeline within processor 204 or within coprocessor 206.

The out-of-order queue 229 is sized so that it is rarely the case that an instruction is kept from issuing due to its being in the in-order queue when it otherwise would have been issued if the OoO queue were larger. In an exemplary implementation, the in-order FIFO queue 228 and out-of-order queue 229 are each sixteen entries with the coprocessor having coprocessor store (CS) issue pipeline 236 coupled to a CS execution pipeline 237, a coprocessor load (CL) issue pipeline 238 coupled to a CL execution pipeline 239, and a coprocessor function (CX) issue pipeline 240 coupled to a CX execution pipeline 241. Also, a coprocessor register file (CRF) 242 may be coupled to each execution pipeline. The capacity of the out-of-order queue 229 would be increased if any of the execution pipelines 237-239 were idle while waiting for an instruction that resides in the in-order queue 228. The capacity of the in-order queue 228 would be increased if an existing capacity of both the in-order queue 228 and out-of-order queue 229 when filled is not sufficient to relieve backpressure from the processor. In this case, the processor is prevented from issuing coprocessor instructions which in turn keeps the processor from issuing younger processor instructions. The capacity of the in-order queue 228 may also be matched to support the number of instructions the processor 204 is capable of sending to the coprocessor 206. In this manner, a burst capability of the processor 204 to send coprocessor instructions may be better balanced with a burst capability to drain coprocessor execution pipelines. By having a sufficient number of instructions enqueued, the coprocessor 206 would not be starved when instructions are rapidly drained from the hybrid instruction queue 225 and the processor 204 is unable to quickly replenish the queue.

Figure 3A:
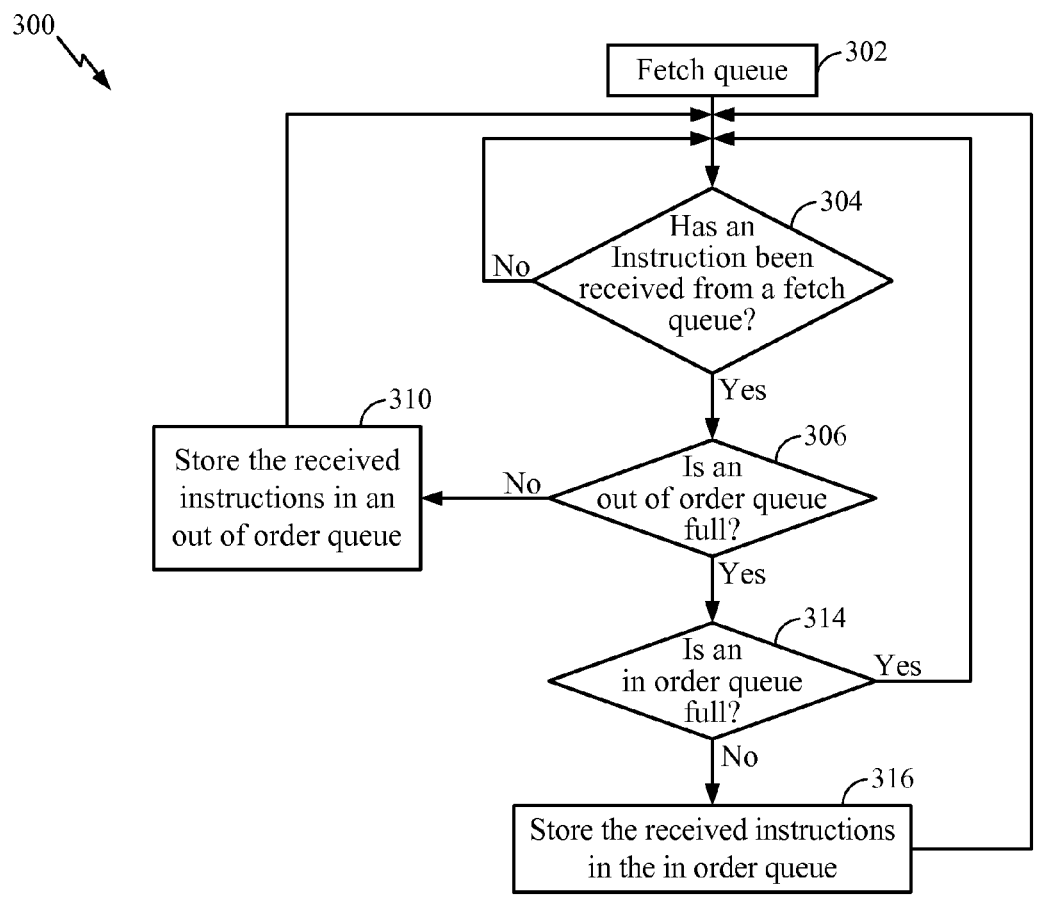
FIG. 3A is a graphical illustration of a process for queueing instructions in which an embodiment of the invention may be advantageously employed.

FIG. 3A illustrates a process 300 for queuing instructions in accordance with the present invention. The process 300 follows instruction operations in the coprocessor 206. References to previous figures are made to emphasize and make clear implementation details, and not as limiting the process to those specific details. At block 302, a fetch queue, such as instruction fetch queue 208 of FIG. 2, is monitored for a first type of instruction, such as a coprocessor instruction. At decision block 304, a determination is made whether an instruction has been received from the fetch queue. If an instruction has not been received, the process 300 returns and waits until an instruction is received. When an instruction is received, the process 300 proceeds to decision block 306. At decision block 306, a determination is made whether an out-of-order queue, such as out-of-order queue 229, is full of instructions. The queue and hazard control circuit 230 tracks a full or not full status of the out-of-order queue 229 and provides a first signal indicating such status. If the out-of-order queue is not full, the process 300 proceeds to decision block 310. At block 310, the received instruction is stored in the out-of-order queue. The process 300 then returns to decision block 304 to wait till the next instruction is received.

Returning to decision block 306, if the out-of-order queue is full, the process 300 proceeds to decision block 314. At decision block 314, a determination is made whether the in-order queue is also full. The queue and hazard control circuit 230 also tracks a full or not-full status of the in-order queue 228 and provides a second signal indicating such status. If the in-order queue is full, the process 300 returns to decision block 304 with the received instruction pending to wait until space becomes available in either the out-of-order queue or the in-order queue or both. An issue process 320, described below, issues instructions from the out-of-order queue which then clears space in the out-of-order queue for instructions. Returning to decision block 314, if the in-order queue is not full, the process 300 proceeds to block 316. At block 316, the received instruction is stored in the in-order queue and the process 300 returns to decision block 304 to wait till the next instruction is received.

Note that there can also be an implementation where several instructions are transited en masse from the instruction fetch queue and they might not be able to be stored into the OoO queue if there is not room enough for all of the instructions. In such a case, the several instructions are stored in the in-order queue and later moved to the OoO queue, as room permits, even if no instructions issue from the OoO queue or no new instructions enter the in-order queue For example, some instructions in the OoO queue may be canceled due to program flow events identified in the processor and free up space in the OoO queue. In one embodiment, a group of instructions, such as four instructions, may be transited from the coprocessor instruction selector 224 to the out-of-order queue 229 or to the in-order queue 228 depending upon a queue's ability to accept the group of instructions. In one operation scenario, the out-of-order queue 229 has room for two coprocessor instructions and the in-order queue 228 has room for six coprocessor instructions. A group of four coprocessor instructions is transited to the in-order queue 228 which is able to accept the group of four coprocessor instructions. The in-order queue 228 then transfers two of the most current coprocessor instructions from the in-order queue 228 to the available two coprocessor locations in the out-of-order queue 229. If the in-order queue 228 and the out-of-order queue 229 both had only two coprocessor instruction locations available, the group of four coprocessor instructions would not be transited until room for the four coprocessor instructions becomes available in one of the queues.

Figure 3B:
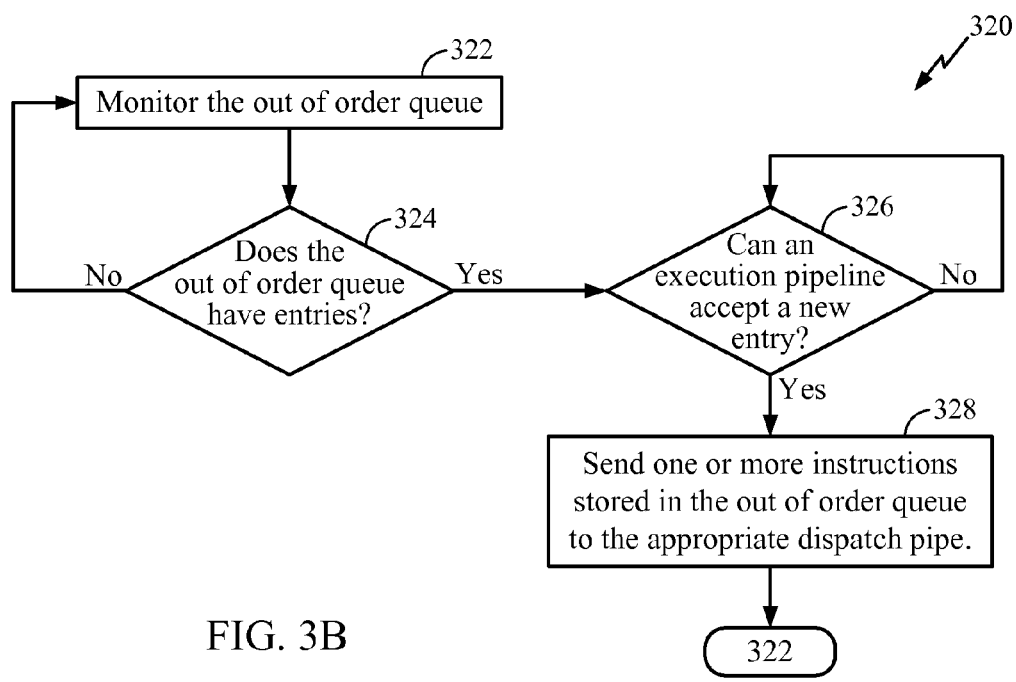
FIG. 3B is a graphical illustration of a process for issuing instructions in which an embodiment of the invention may be advantageously employed.

FIG. 3B illustrates a process 320 for issuing instructions in accordance with the present invention. At block 322, an out-of-order queue, such as out-of-order queue 229, is monitored for instructions to be executed. At decision block 324, a determination is made whether the out-of-order queue has any instruction entries. If there are no instructions to be executed in the out-of-order queue, the process 320 returns to block 322 to monitor the out-of-order queue. If there are instructions in the out-of-order queue, the process 320 proceeds to decision block 326. At decision block 326, a determination is made whether an execution pipeline is available that can accept a new instruction for execution. If all the execution pipelines are busy, the process 320 waits until an execution pipeline frees up. When an execution pipeline is available to accept a new instruction for execution, the process 320 proceeds to block 328. At block 328, an instruction, stored in the out-of-order queue, is issued avoiding hazards such as dependency conflicts between instructions, to an available issue pipeline. If more than one issue pipeline is available, multiple instructions without dependencies from the out-of-order queue may be issued out of program order across multiple separate pipelines. If multiple instructions are destined for the same pipeline, those instructions may remain in program order. Once an instruction or instructions are issued from the out-of-order queue, space is freed up in the out-of-order queue. The process 320 proceeds to block 322 to monitor the out-of-order queue.

Figure 3C:
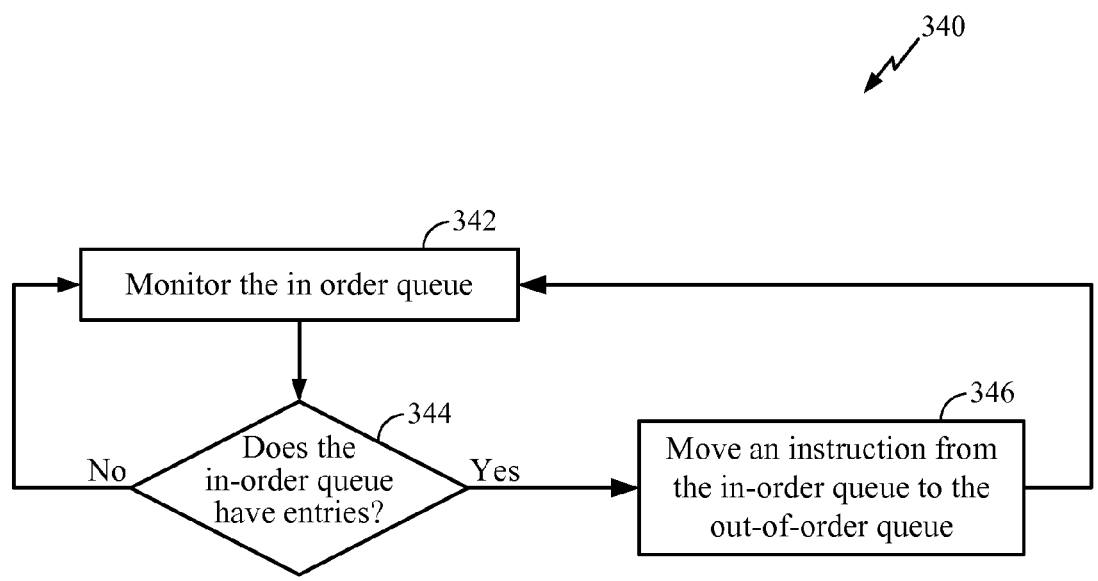
FIG. 3C is a graphical illustration of a process for moving instructions from an in-order queue to an out-of-order queue.

FIG. 3C illustrates a process 340 for moving instructions from the in-order queue to the out-of-order queue. Whenever there is space in the out-of-order queue, and one or more instructions exist in the in-order queue, those instructions are moved to the out-of-order queue. At block 342, the process 340 monitors the in-order queue. At decision block 344, a determination is made whether an in-order queue, such as in-order queue 228, has any entries. If the in-order queue does not have any instructions, the process 340 proceeds to block 342. If the in-order queue has one or more instruction entries, the process 340 proceeds to block 346. At block 346, the one or more instructions stored in the in-order queue are moved to space available in the out-of-order queue. The process 340 then returns to block 342 to monitor the in-order queue.

Figure 4:
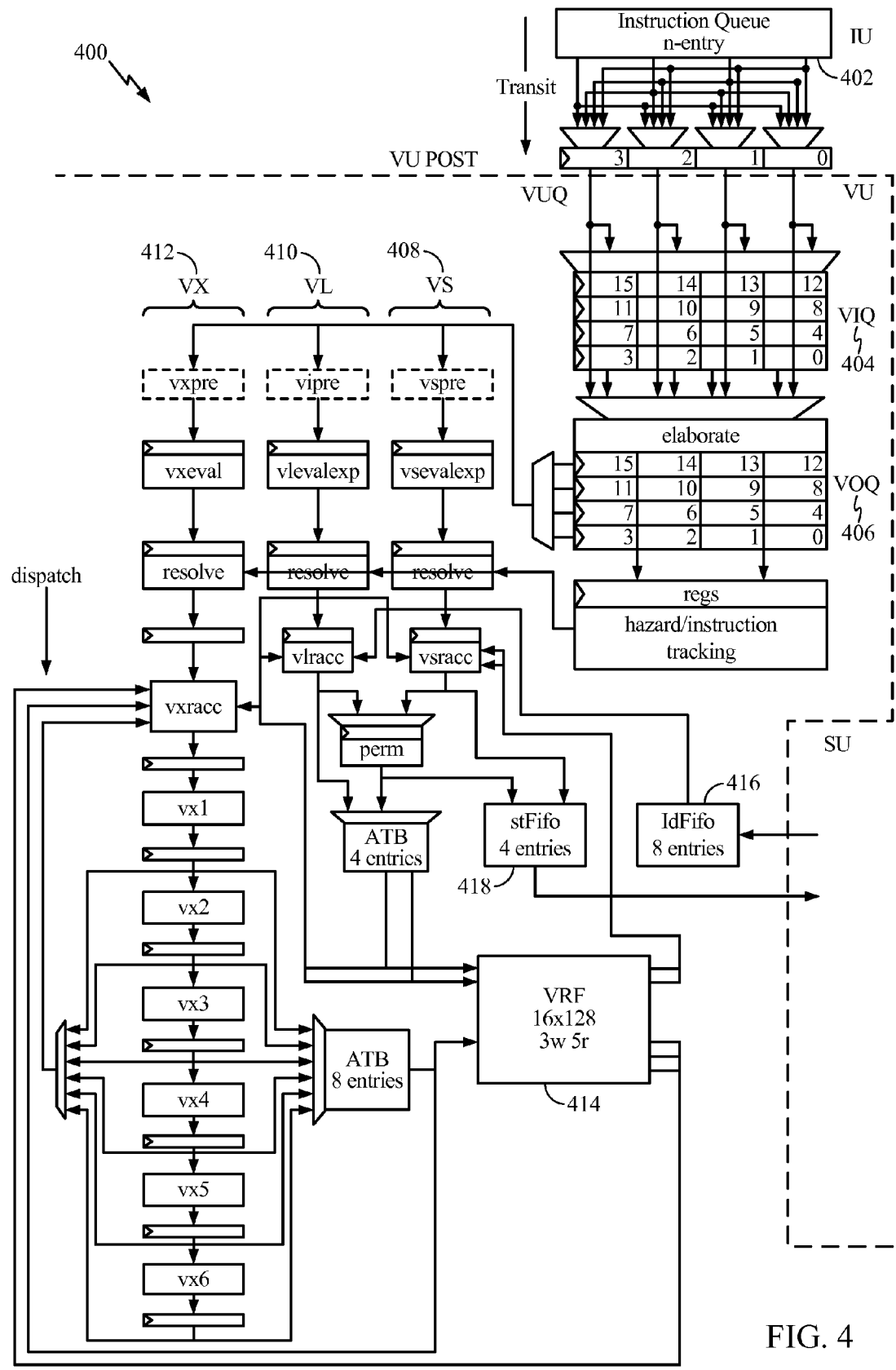
FIG. 4 is a graphical illustration of an exemplary embodiment of a coprocessor and processor interface in which an embodiment of the invention may be advantageously employed.

FIG. 4 illustrates an exemplary embodiment of a coprocessor and processor system 400 in accordance with the present invention. An n-entry instruction queue 402 corresponds to the instruction fetch queue 208. The coprocessor illustrated in FIG. 4 is a vector processor having a vector in-order queue (VIQ) 404 corresponding to in-order queue 228 and a vector out-of-order queue (VOQ) 406 corresponding to out-of-order queue 229. The system 400 also comprises a vector store pipeline (VS) 408, a vector load pipeline (VL) 410, and a vector function execution pipeline (VX) 412 having six function computation stages (Vx1-Vx6). The VS, VL, and VX pipelines are coupled to a vector register file (VRF) 414 and collectively correspond to the coprocessor execution complex 226. A load buffer (ldFifo) 416 and a store buffer (stFifo) 418 provide elastic buffers between the processor and the coprocessor. For example, when the coprocessor has data to be stored, the data is stored in the stFifo 418 from which the processor takes the data when the processor can complete the store operation. The ldFifo 416 operates in a similar manner but in the reverse direction.

The various illustrative logical blocks, modules, circuits, elements, or components described in connection with the embodiments disclosed herein may be implemented using an application specific integrated circuit (ASIC), a field programmable gate array (FPGA) or other programmable logic components, discrete gate or transistor logic, discrete hardware components, or any combination thereof designed to perform the functions described herein. A general purpose processor may be a microprocessor, but in the alternative, the processor may be any conventional processor, a special purpose controller, or a micro-coded controller. A system core may also be implemented as a combination of computing components, for example, a combination of a DSP and a microprocessor, a plurality of microprocessors, one or more microprocessors in conjunction with a DSP core, or any other such configuration appropriate for a desired application.

The methods described in connection with the embodiments disclosed herein may be embodied in hardware and software executed by a processor. The processor 204 may access processor and coprocessor instructions and data from the memory hierarchy 202 in the execution of a program, for example. The software comprising one or more programs is stored as non-transitory signals on a computer readable storage medium. The computer readable storage medium may be directly associated with a processor, such as processor 204 or accessible, for example, through interfacing means. The storage medium may be coupled to the processor such that the processor can read information from, and in some cases write information to, the storage medium. The storage medium coupling to the processor may be a direct coupling integral to a circuit implementation or may utilize one or more interfaces, supporting direct accesses or data streaming using down loading techniques. The computer readable storage medium may include random access memory (RAM), dynamic random access memory (DRAM), synchronous dynamic random access memory (SDRAM), flash memory, read only memory (ROM), programmable read only memory (PROM), erasable programmable read only memory (EPROM), electrically erasable programmable read only memory (EEPROM), compact disk (CD), digital video disk (DVD), other types of removable disks, or any other suitable storage medium.

While the invention is disclosed in the context of illustrative embodiments for use in processor systems it will be recognized that a wide variety of implementations may be employed by persons of ordinary skill in the art consistent with the above discussion and the claims which follow below. For example, fixed function implementations may also utilize various embodiments of the present invention.

What is claimed is:

1. A queuing apparatus having a hierarchy of queues, the queuing apparatus comprising:
a fetch queue coupled to an instruction cache and configured to store first instructions for a first processor and second instructions for a second processor in an order fetched from the instruction cache;
an in-order queue coupled to the fetch queue and configured to store the second instructions accepted from the fetch queue in response to a write indication, wherein the second instructions are maintained in the order fetched; and
an out-of-order queue coupled to the fetch queue and to the in-order queue and configured to store the second instructions accepted from the fetch queue in response to an indication that space is available in the out-of-order queue and there are no pending second instructions stored in the in-order queue, wherein second instructions without dependency conflicts are accessed for execution out-of-order with respect to other second instructions executing on different execution pipelines, the write indication is generated when the out-of-order queue is full and the in-order queue is not full, and wherein the second instructions are stored in the in-order queue to provide additional capacity for queue storage associated with the second processor when the out-of-order queue is full.

2. The queuing apparatus of claim 1, wherein the second instructions are out-of-order with respect o the first instructions.

3. The queuing apparatus of claim 1, wherein the out-of-order queue is configured to store second instructions accepted from the in-order queue prior to second instructions accepted from the fetch queue.

4. The queuing apparatus of claim 1, wherein the write indication is generated in response to an indication that space is not available in the out-of-order queue.

5. A method for queuing instructions received from a fetch queue coupled to an instruction cache in a hybrid queue, the method comprising:
accepting instructions by an out-of-order queue in-order as received from an input of a hybrid queue over a bypass path to the out-of-order queue when space is available in the out-of-order queue, wherein the instructions are accessed out-of-order from the out-of-order queue for execution; and
accepting additional instruction in-order as received from the input of the hybrid queue to an in-order queue when space is not available in the out-of-order queue, wherein the in-order queue is configured to output the additional instructions in the order that the additional instructions were previously accepted in the in-order queue, the additional instructions provided over a second path to the out-of-order queue when space is available in the out-of-order queue and wherein the in-order queue is bypassed by use of the bypass path when space is available in the out-of-order queue and the in-order queue is empty.

6. The method of claim 5, further comprising:
providing the instructions from a fetch queue that is coupled to an instruction cache, wherein the fetch queue includes the instructions for a first processor and second instructions for a second processor.

7. The method of claim 5, wherein the out-of-order queue accepts the instructions provided from the in-order queue ahead of other incoming instructions.

8. The method of claim 5, further comprising:
a fetch queue coupled to the in-order queue, to the out-of-order queue, and to a cache, wherein the instructions are fetched from the cache and stored in the fetch queue and the instructions are coprocessor instructions for a coprocessor in a multiprocessor system.

9. The method of claim 8, further comprising:
accessing the instructions from the fetch queue for storage in the out-of-order queue when a first signal indicates space is available in the out-of-order queue.

10. The method of claim 8, further comprising:
accessing the instructions from the fetch queue for storage in the in-order queue when a first signal indicates space is not available in the out-of-order queue and a second signal indicates space is available in the in-order queue.

11. The method of claim 8, wherein a capacity of the in-order queue is determined by backpressure from a processor coupled to the fetch queue.

12. The method of claim 5, further comprising:
a plurality of execution pipelines coupled to the out-of-order queue, wherein the instructions are issued in-order from the out-of-order queue to a first execution pipeline and are issued out-of-order across the plurality of execution pipelines.

13. The method of claim 5, wherein a capacity of the out-of-order queue is determined by a number of instructions which can be issued to a plurality of execution pipelines attached to the out-of-order queue.

14. A method for issuing instructions received from a fetch queue coupled to an instruction cache, the method comprising:
receiving a first set of instructions and a second set of instructions in a program order in a hybrid queue comprising an out-of-order queue and an in-order queue;
storing the first set of received instructions in the out-of-order queue until the out-of-order queue is full;
storing the second set of received instructions in the in-order queue in the program order in response to an indication that the out-of-order queue is full;
moving according to the program order the second set of received instructions stored in the in-order queue to the out-of-order queue when space is available in the out-of-order queue; and
issuing the first set of received instructions stored in the out-of-order queue to separate execution pipelines, wherein the first set of received instructions are accessed out-of-order for execution with respect to other issued instructions executing on different execution pipelines, wherein the second set if instructions are stored in the in-order queue to provide additional capacity for the hybrid queue when the out-of-order queue is full.

15. The method of claim 14, further comprising:
receiving a third set of instructions;
storing the third set of received instructions in the in-order queue while at least one of the second set of received instructions is moved from the in-order queue to the out-of-order queue.

16. The method of claim 14, wherein the first set of received instructions are coprocessor instructions provided from an instruction memory that stores coprocessor instructions and processor instructions arranged in a program order.

17. The method of claim 14, wherein the first set of received instructions are coprocessor instructions gathered from an instruction fetch queue that stores coprocessor instructions and processor instructions arranged in a program order.

18. The method of claim 14, wherein the first set of instructions and the second set of instructions are gathered from an instruction fetch queue, wherein the instruction fetch queue is coupled to an instruction cache, to the in-order queue, and to the out-of-order queue.

19. The method of claim 14, wherein the first set of received instructions are stored in the out-of-order queue in the program order as they are received.

20. The method of claim 14, wherein the first set of received instructions are issued from the out-of-order queue out of program order.

21. A queuing apparatus having a hierarchy of queues, the queuing apparatus comprising:
means for storing first instructions for a first processor and second instructions for a second processor in a fetch queue in an order fetched from an instruction cache;
means for storing in an in-order queue the second instructions accepted from the fetch queue in response to a write indication, wherein the second instructions are maintained in the order fetched; and
means for storing in an out-of-order queue the second instructions accepted from the fetch queue in response to an indication that space is available in the out-of-order queue and there are no pending second instructions stored in the in-order queue, wherein second instructions without dependency conflicts are accessed for execution out-of-order with respect to other second instructions executing on different execution pipelines, the write indication is generated when the out-of-order queue is full and the in-order queue is not full, and wherein the second instructions are stored in the in-order to provide additional capacity for queue storage associated with the second processor when the out-of-order queue is full.

22. A computer readable non-transitory medium encoded with computer readable program data and code, the program data and code when executed operable to issue instructions received from a fetch queue coupled to an instruction cache:
accept instructions by an out-of order queue in-order as received from an input of a hybrid queue over a bypass path to the out-of-order queue when space is available in the out-of-order queue, wherein the instructions are accessed out-of-order from the out-of-order queue for execution; and
accept additional instructions in-order as received from the input to the hybrid queue to in-order queue when space is not available in the out-of-order queue, wherein the in-order queue is configured to provide in the order that the additional instruction were previously accepted in the in-order queue over a second path to the out-of-order queue when space is available in the out-of-order queue and wherein the in-order queue is bypassed by use of the bypass path when space is available in the out-of-order queue and the in-order queue is empty.

23. A computer readable non-transitory medium encoded with computer readable program data and code, the program data and code when executed operable to issue instructions received from a fetch queue coupled to an instruction cache:
receive a first set of instructions and a second set of instructions in a program order in a hybrid queue comprising an out-of-order queue and an in-order queue;
store the first set of received instructions in the out-of-order queue until the out-of-order queue is full;
store the second set of received instructions in the in-order queue in the program order in response to an indication that the out-of-order queue is full;
move according to the program order the second set of received instructions stored in the in-order queue to the out-of-order queue when space is available in the out-of-order queue; and
issue the first set of received instructions stored in the out-of-order queue to separate execution pipelines, wherein the first set of received instructions are accessed out-of-order for execution with respect to other issued instructions executing on different execution pipelines, wherein the second set of instructions are stored in the in-order queue to provide additional capacity for the hybrid queue when the out-of-order queue is full.

* * * * *